(12) United States Patent
Wojcik

(10) Patent No.: US 6,706,214 B2
(45) Date of Patent: Mar. 16, 2004

(54) COMPOSITION AND PROCESS FOR INHIBITING CORROSION OF METALLIC SUBSTRATES

(76) Inventor: Gerald Wojcik, 429 Prospect St., Thomaston, CT (US) 06787

( * ) Notice: Subject to any disclaimer, the term of this patent is extended or adjusted under 35 U.S.C. 154(b) by 36 days.

(21) Appl. No.: 10/328,197

(22) Filed: Dec. 23, 2002

(65) Prior Publication Data

US 2003/0143420 A1 Jul. 31, 2003

Related U.S. Application Data

(63) Continuation-in-part of application No. 09/906,370, filed on Jul. 16, 2001, now Pat. No. 6,508,958.

(51) Int. Cl.$^7$ .................. C09K 15/06; C09K 15/16; C09K 15/32; C23F 11/00; C08B 37/08
(52) U.S. Cl. ................. 252/389.21; 252/389.22; 252/389.23; 252/391; 252/395; 252/400.21; 252/400.22; 252/400.23; 252/402; 252/406; 106/14.12; 106/14.16; 106/14.37; 427/388.2; 427/385.5; 536/20
(58) Field of Search .............. 252/389.22, 389.21, 252/389.23, 389.24, 390, 391, 395, 400.2, 400.21, 400.22, 400.23, 400.24, 402, 405, 400; 536/20, 124; 427/334, 385.5, 388.2; 106/14.12, 14.16, 14.37

(56) References Cited

U.S. PATENT DOCUMENTS

| | | | | |
|---|---|---|---|---|
| 4,031,025 A | * | 6/1977 | Vanlerberghe et al. | 252/180 |
| 5,059,686 A | * | 10/1991 | Sau | 536/114 |
| 5,328,939 A | * | 7/1994 | Smith | 521/187 |
| 5,900,462 A | | 5/1999 | Tanaka | |
| 5,900,479 A | | 5/1999 | Glasser et al. | |
| 5,977,330 A | * | 11/1999 | Lohmann et al. | 536/20 |
| 6,139,688 A | | 10/2000 | Ramachandran | |
| 6,150,033 A | | 11/2000 | Mosser et al. | |
| 6,165,378 A | | 12/2000 | Maruno et al. | |
| 6,174,999 B1 | | 1/2001 | Miller et al. | |
| 6,187,902 B1 | | 2/2001 | Yanase et al. | |
| 6,194,033 B1 | | 2/2001 | Shimizu et al. | |
| 6,207,772 B1 | | 3/2001 | Hatsuda et al. | |
| 6,350,797 B1 | * | 2/2002 | Weller | 524/82 |
| 6,451,337 B1 | * | 9/2002 | Smith et al. | 424/445 |
| 6,458,938 B1 | * | 10/2002 | Cha et al. | 536/20 |
| 6,461,682 B1 | | 10/2002 | Crotty et al. | |
| 6,508,958 B1 | * | 1/2003 | Wojcik | 252/389.21 |
| 6,518,335 B2 | * | 2/2003 | Reedy et al. | 524/82 |

FOREIGN PATENT DOCUMENTS

| | | | |
|---|---|---|---|
| DE | 3432227 A1 | * | 3/1986 |
| DE | 3600333 A1 | * | 9/1986 |
| JP | 62262743 | * | 11/1987 |
| JP | 62266196 | * | 11/1987 |
| JP | 6372702 | * | 4/1988 |
| JP | 9165404 | * | 6/1997 |
| JP | 10204104 | * | 10/1998 |
| WO | WO03020771 | * | 3/2003 |

OTHER PUBLICATIONS

Derwent–Acc–No.: 1997–381311 (1997).*
Derwent–Acc–No.: 1987–359569 (1987).*
Derwent–Acc–No.: 1988–003077 (1988).*
Derwent–Acc–No.: 1986–076460 (1986).*
Derwent–Acc–No.: 1998–476758 (1998).*
English Language Abstract Pub–No.: DE003600333A1 (1986).*
English Language Abstract Pub–No.: JP363072702A (1988).*
Progress In Organic Coatings 38, (2000) 79–87 "Poly(itaconic acid)–modified chitosan coatings for mitigating corrosion of aluminum substrates".

* cited by examiner

Primary Examiner—Joseph D. Anthony
(74) Attorney, Agent, or Firm—Carmody & Torrance LLP

(57) ABSTRACT

A composition and process for inhibiting the corrosion of metallic substrates is revealed. The process utilizes an aqueous treatment solution comprising chitosan which has been reacted with an additive selected from the group consisting of phosphorus-containing compounds and sulfur-containing compounds and mixtures thereof. More preferably, the phosphorus-containing compound is a phosphonic acid and the sulfur-containing compound is a mercapto, thio, or thienyl containing compound or a mercapto functional silane. The composition and process are particularly useful in providing corrosion protection for aluminum and aluminum alloys.

11 Claims, No Drawings

COMPOSITION AND PROCESS FOR INHIBITING CORROSION OF METALLIC SUBSTRATES

CROSS-REFERENCE TO RELATED APPLICATIONS

This application is a continuation-in-part of copending application Ser. No. 09/906,370, filed on Jul. 16, 2001 now U.S. Pat. No. 6,508,958.

FIELD OF THE INVENTION

The present invention relates to compositions and processes for providing corrosion protection for metal substrates, particularly substrates comprised of aluminum or aluminum alloys, using treatment solutions comprising chitosan, which has been reacted with selected acids.

BACKGROUND OF THE INVENTION

Many metals are susceptible to corrosion. In this regard, atmospheric corrosion is of particular concern. Corrosion may affect the performance and/or appearance of the metals affected, and the products produced therefrom. In addition, when polymer coatings such as paints, adhesives or sealants are applied to the metal, corrosion of the underlying metal may cause loss of adhesion between the polymer coating and the base metal.

Aluminum and aluminum alloys frequently require corrosion protection and improvements in adhesion between the base aluminum (or aluminum alloys) and subsequent polymer coatings. Aluminum alloys, in particular, can be susceptible to corrosion since the alloying elements used to improve the aluminum's mechanical properties may decrease corrosion resistance.

Specifications for testing the effectiveness of the corrosion inhibition and adhesion promotion of various treatments have been established. Examples of such specifications include ASTM standard D3359-87, ASTM standard B117 and Military specification MIL-C-5541D.

Prior art techniques for improving corrosion resistance of metals widely employ the use of chromate conversion coatings to passivate the surface. Such chromate treatments are undesirable however, because the chromium used is highly toxic, carcinogenic, and environmentally undesirable. Various attempts have been made to reduce the toxicity of these chromium treatments, including the use of trivalent chromium in place of the more toxic hexavalent chromium, but these attempts have proven less than completely successful.

Phosphate conversion coatings are also used, but generally provide substantially less corrosion protection than is typically desired. More recently the use of treatment compositions comprising silicates and/or silanes has been proposed. However, these treatments have also fallen short of corrosion protection expectations in many cases.

As a result, there remains a real need for non-toxic treatment solutions which are safe to handle and provide the level of corrosion protection typically demanded in a variety of applications. The composition and process of the current invention are meant to address the foregoing needs.

Thus it is an object of this invention to provide an improved method of inhibiting corrosion of metals, especially aluminum and aluminum alloys, which is simple to employ, cost effective and environmentally friendly. It is a further object of this invention to provide a treatment for metals which improves the adhesion of subsequent organic coatings to the metal while at the same time improving the corrosion resistance of the metal.

SUMMARY OF THE INVENTION

The foregoing objectives can be accomplished by treating a metal, particularly aluminum or aluminum alloys, with a treatment composition which comprises an aqueous solution of chitosan which has been reacted with an additive selected from the group consisting of phosphorus-containing additives, sulfur-containing additives, and mixtures thereof. The presence of phosphorus as a phosphonic acid and/or sulfur as a mercapto, thio, or thienyl group, or as a mercapto functional silane is especially preferred. The treatment composition is applied directly to a clean metal surface by immersion, spray, flood or other means of direct contact. The treatment solution is preferably applied to the metal at a temperature of from 70° F. to 150° F. Preferably the treatment solution is acidic enough to solubilize the acid modified chitosan.

Preferably, the metal surface is cleaned, deoxidized, and/or etched prior to treatment with the chitosan based treatment solution. A variety of known cleaners, deoxidizers and/or etchants may be employed for this purpose, with the appropriate choice being made with the specific metal surface to be prepared in mind.

Once the chitosan treatment is applied to the metal surface the treated surface should be allowed to dry. Drying may occur at room temperature or upon baking the surfaces at temperatures that preferably do not exceed about 200° C.

The compositions and processes of this invention are particularly suitable for treating aluminum and aluminum alloys. The inventor has found that treating aluminum or aluminum alloys with the modified chitosan solution of this invention provides both increased corrosion resistance and enhanced adhesion of subsequent organic coatings to the treatment surfaces.

DETAILED DESCRIPTION OF THE INVENTION

Chitosan, a derivative of the polysaccharide chitin, is a polymer obtained from the shells of crustaceans such as crabs, lobsters and shrimp. The major issue with utilizing chitosan as a barrier against corrosion protection is its affinity to absorb atmospheric moisture, which transforms the polymer into a non-protective gel. This problem can be satisfactorily circumvented by reacting the chitosan with additives containing either phosphorous or sulfur. Such reactions are desirable because they tend to bridge between chitosan strands within the glucosamine ring structure, resulting in bonds that are hydrophobic in nature. The presence of phosphorous as a phosphonic acid and sulfur as a mercapto, thio or thienyl group is most desired. This effectively reduces the permeability of the chitosan polymer matrix.

Chitosan is the product of deacetylation of chitin. Generally chitosan is an amorphous solid which is soluble in aqueous solutions with pH less than about 6. Chitosan is of nearly identical structure to chitin, except that it is de-acetylated. The chemical structure of chitosan is as follows:

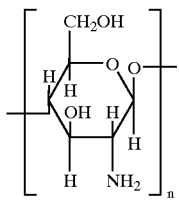

where n represents the number of repeating units in the polymer chain. Because chitosan is more easily solubilized than chitin, chitosan is preferred for use in the process of the invention. Chitosan is also a low cost polymer, since its source, chitin, comes from the shells of marine crustaceans.

The inventor herein has discovered that although aqueous solutions of chitosan, itself, do not adequately function as corrosion prevention treatments for metallic surfaces, certain modified chitosans do provide desirable levels of corrosion protection for metals. Specifically the inventor herein has discovered that aqueous solutions of chitosan which has been reacted with an additive selected from the group consisting of phosphorus-containing additives, sulfur-containing additives, and mixtures thereof, provide an excellent corrosion protection treatment for metals. The presence of phosphorus as a phosphonic acid and/or sulfur as a mercapto, thio, or thienyl group or a mercapto functional silane is most preferred.

Without being bound by theory, it is believed that when the phosphorus and/or sulfur-containing additive(s) are reacted with the chitosan, they tend to form amide bonds with the glucosamine ring structure, thereby bridging between chitosan strands. The resulting modified chitosan structure is more hydrophobic in nature than the unmodified chitosan structure, thereby reducing the permeability of the modified chitosan matrix. It is believed that this reduction in permeability of the modified chitosan matrix provides better corrosion protection for the treated metal.

As noted above, the modified chitosan is created by reacting chitosan with an additive selected from the group consisting of phosphorus-containing additives, sulfur-containing additives, and mixtures thereof. Preferably, the additive is a phosphonic acid or sulfur as a mercapto, thio, or thienyl group or a mercapto functional silane.

Mercapto functional silanes have been used to inhibit corrosion on aluminum or aluminum alloy surfaces, as described in U.S. Pat. No. 6,461,682 to Crotty et al., the subject matter of which is herein incorporated by reference in its entirety. However, mercapto functional silanes have not previously been used to modify chitosan as is described in the instant invention.

Preferred phosphorus-containing additives include phytic acid, aminotri(methylenephosphonic)acid, hydroxyethane-di-phosphonic acid, diethylenetriamine-penta-methylene phosphonic acid, ethylenediamine-tetra-methylene phosphonic acid, hydroxyethylamino-di-methylene phosphonic acid, hexamethylenediamine-tetra-methylene phosphonic acid, and 2-phosphonbutane-1,2,4-tricarboxylic acid.

Preferred mercapto, thio, and thienyl compounds include mercaptosuccinic acid, 3-(2-thienyl)acrylic acid, 3-(3-thienyl)acrylic acid, 4-(-2-thienyl)butyric acid, and 3,3-thiodipropionic acid.

Preferred mercapto functional silanes include (3-mercaptopropyl) trimethoxy silane, (3-mercaptopropyl) methyldimethoxy silane, and (3-mercaptopropyl)triethoxy silane.

Preferably, the foregoing additives are reacted with the chitosan at elevated temperatures. One method of preparing the treatment solution of this invention is as follows:

1) Adjust the pH of distilled water to less than 1 with a mineral acid such as hydrochloric acid.
2) Dissolve chitosan in the acidified distilled water with stirring and heat.
3) Create a concentrated solution of a compound selected from the group consisting of phosphorus-containing compounds and sulfur-containing compounds and mixtures thereof, in distilled water.
4) Add the concentrated solution from step 3 to the chitosan solution from step 2 with stirring and heat. Preferably the combined solution is heated to at least 150–190° F. and held there for about one hour then allowed to cool.
5) Preferably filter the resulting treatment solution.

The additive used to react with and modify the chitosan should be selected from phosphorus-containing compounds, sulfur-containing compounds, and mixtures thereof. More preferably, the additive should be a phosphonic acid compound or a mercapto, thio, or thienyl compound, or a mercapto functional silane. The weight ratio of reactant additive to chitosan should be kept in the range of between 10%/90% to 90%/10% and is preferably from 20% to 80%. Polyacids which are either insoluble or very slightly soluble in water are preferred, since they are believed to synergistically increase the hydrophobic nature of the coating produced.

Chitosan and the modified chitosans of this invention are only very sparingly soluble in water but their solubility increases in acidified water. As a result, the modified chitosans of this invention should be dissolved into an aqueous solution which preferably has pH adjusted to less than about 1, preferably with a mineral acid such as hydrochloric acid. The concentration of the modified chitosan in the treatment solution should range from about 1 to 20 grams per liter and is preferably from about 5 to 10 grams per liter.

In addition to the water, the mineral acid and the modified chitosan, the treatment solution may also contain other additives such as solvents, surfactants, thickeners and other similar additives. Solvents and/or surfactants may be used to enhance the cleaning properties of the treatment solution and to improve the overall contact between the treatment solution and the metal surface being treated, thereby increasing the uniformity of the coating created. In this regard, 2-butoxyethanol is a preferred solvent. Solvents such as 2-butoxyethanol may also be used to solubilize or disperse the reactant acids in the aqueous solution.

Before application of the treatment solution to the metal surface, it is preferred to clean, deoxidize and/or etch the metal surface so that the uniformity and adhesion of the subsequently formed corrosion protection coating is enhanced. A variety of known cleaners, deoxidizers and/or etchants may be employed for this purpose, with appropriate choice being made with the specific metal surface to be prepared in mind. For aluminum and aluminum alloy surfaces the inventor has found Isoprep 49L and Isoprep 184, available from MacDermid, Incorporated of Waterbury, Conn., to be a particularly effective pre-treatment for cleaning and deoxidizing the surfaces prior to treatment with the process of this invention.

The treatment solution of this invention is applied directly to a clean metal surface by immersion, spray, flood or other means of direct contact. The solution is preferably applied to the metal at a temperature of from 70° F. to 150° F. Contact time between the treatment solution and the metal can range from 30 seconds to 5 minutes and is dependent upon the temperature of the treatment solution and the method of application.

Once the treatment solution is applied to the metal surface, the treated surface should be allowed to dry. Drying may occur at room temperature, or upon baking at temperatures which preferably do not exceed about 200° C.

The compositions and processes of this invention may be utilized on a variety of ferrous and non-ferrous metal surfaces, however, they are particularly suited to treating aluminum and aluminum alloys. The inventor has found that treating aluminum and aluminum alloys with the treatment solution of this invention provides both increased corrosion resistance and enhanced adhesion of subsequent organic coatings, such as paints, to the treated surfaces.

A preferred coating composition comprises 0.50 percent by weight hydrochloric acid, 0.35 to 0.45 percent by weight chitosan, 0.05 to 0.15 percent by weight of the phosphorus or sulfur containing additive, and 99.00 percent by weight water. Other compositions would also be contemplated by one skilled in the art.

The following examples further illustrate the composition and process of the invention, but should not be taken as limiting in any manner.

EXAMPLE I

A treatment composition in accordance with this invention was prepared with the following composition:

| Component | Concentration (% by weight) |
|---|---|
| Hydrochloric Acid | 0.50 |
| Chitosan | 0.35 |
| Aminotri(methylenephosphonic) acid | 0.15 |
| Water | 99.00 |

The foregoing treatment composition was prepared using the following procedure:

1) Place 100 ml of distilled water in a 250 ml beaker along with a stirbar. Begin stirring and add 1.0 gram HCL.
2) Add 0.7 g of chitosan and heat to 190° F. Allow to stir for 3 hours while covered with a watchglass.
3) In a separate beaker with stirbar, place 100 ml of distilled water and 0.3 grams of Aminotri (methylenephosphonic) acid and stir until well mixed.
4) Add the contents of the second beaker to that of the first. Cover with a watchglass, heat to 190° F. and stir. Hold at temperature for one hour and then allow to cool to room temperature. Add back water to bring to original volume.
5) Once cooled, filter with a Buchner funnel using number 4 filter paper.

An aluminum substrate was sequentially pre-treated, in accordance with the manufacturer's instructions, with MacDermid Isoprep 49L and Isoprep 184 in order to clean and deoxidize the surface. The surface was then rinsed with water.

The aluminum substrate was then immersed in the treatment solution of 75° F. for one minute. The substrate was removed from the treatment solution and dried at 175° C. for 30 minutes.

The treated aluminum substrate was then exposed to salt spray exposure. The aluminum substrate remained for 360 hours before corrosion was apparent.

EXAMPLE II

A treatment composition in accordance with this invention was prepared with the following composition:

| Component | Concentration (% by weight) |
|---|---|
| Hydrochloric Acid | 0.50 |
| Chitosan | 0.35 |
| Mercaptosuccinic Acid | 0.15 |
| Water | 99.00 |

The foregoing treatment composition was prepared using the following procedure:

1) Place 100 ml of distilled water in a 250 ml beaker along with a stirbar. Begin stirring and add 1.0 gram HCL.
2) Add 0.7 g of chitosan and heat to 190° F. Allow to stir for 3 hours while covered with a watchglass.
3) In a separate beaker with stirbar, place 100 ml of distilled water and 0.3 grams of mercaptosuccinic acid and stir until well mixed.
4) Add the contents of the second beaker to that of the first. Cover with a watchglass, heat to 190° F. and stir. Hold at temperature for one hour and allow to cool to room temperature. Add back water to bring to original volume.
5) Once cooled, filter with a Buchner funnel using number 4 filter paper.

An aluminum substrate was sequentially pre-treated, in accordance with the manufacturer's instructions, with MacDermid Isoprep 49L and Isoprep 184 in order to clean and deoxidize the surface. The surface was then rinsed with water.

The aluminum substrate was then immersed in the treatment solution at 75° F. for 1 minute. The substrate was then removed from the treatment solution and dried at 175° C. for 30 minutes.

The treated aluminum substrate was then exposed to salt spray exposure. The aluminum substrate remained for 456 hours before corrosion was apparent.

EXAMPLE III

A treatment composition in accordance with this invention was prepared with the following composition:

| Component | Concentration (% by weight) |
|---|---|
| Hydrochloric Acid | 0.50 |
| Chitosan | 0.35 |
| 3-(2-thienyl) acrylic acid | 0.15 |
| 2-butoxyethanol | 7.50 |
| Water | 91.50 |

The foregoing treatment composition was prepared using the following procedure:

1) Place 100 ml of distilled water in a 250 ml beaker along with a stirbar. Begin stirring and add 1.0 gram HCL.
2) Add 0.7 g of chitosan and heat to 190° F. Allow to stir for 3 hours while covered with a watchglass.
3) In a separate beaker with stirbar, place 100 ml of distilled water and 15 grams of 2-butoxyethanol and allow to mix well. Add 0.3 grams of 3-(2-thienyl) acrylic acid and stir until well mixed.
4) Add the contents of the second beaker to that of the first. Cover with a watchglass, heat to 190° F. and stir. Hold at temperature for one hour and allow to cool to room temperature. Add back water to bring to original volume.

5) Once cooled, filter with a Buchner funnel using number 4 filter paper.

An aluminum substrate was sequentially pre-treated, in accordance with the manufacturer's instructions with Mac-Dermid Isoprep 49L and Isoprep 184 in order to clean and deoxidize the surface. The surface was then rinsed with water.

The aluminum substrate was then immersed in the treatment solution at 75° F. for 1 minute. The substrate was then removed from the treatment solution and dried at 175° F. for 30 minutes.

The treated aluminum substrate was then exposed to salt spray exposure. The aluminum substrate remained for 384 hours before corrosion was apparent.

EXAMPLE IV

A treatment composition in accordance with this invention was prepared with the following composition:

| Component | Concentration (% by weight) |
|---|---|
| Hydrochloric Acid | 0.50 |
| Chitosan | 0.35 |
| (3-mercaptopropyl) trimethoxysilane | 0.15 |
| 2-butoxyethanol | 7.50 |
| Water | 91.50 |

The foregoing treatment composition was prepared using the following procedure:

1) Place 100 ml of distilled water in a 250 ml beaker along with a stirbar. Begin stirring and add 1.0 gram HCL.
2) Add 0.7 g of chitosan and heat to 190° F. Allow to stir for 3 hours while covered with a watchglass.
3) In a separate beaker with stirbar, place 100 ml of distilled water and 15 grams of 2-butoxyethanol and allow to mix well. Add 0.3 grams of (3-mercaptopropyl) trimethoxysilane and stir until well mixed.
4) Add the contents of the second beaker to that of the first. Cover with a watchglass, heat to 190° F. and stir. Hold at temperature for one hour and allow to cool to room temperature. Add back water to bring to original volume.
5) Once cooled, filter with a Buchner funnel using number 4 filter paper.

An aluminum substrate was sequentially pre-treated, in accordance with the manufacture's instructions, with Mac-Dermid Isoprep 49L and Isoprep 184 in order to clean and deoxidize the surface. The surface was then rinsed with water.

The aluminum substrate was then immersed in the treatment solution at 75° F. for 1 minute. The substrate was then removed from the treatment solution and dried at 175° F. for 30 minutes.

The treated aluminum substrate was then exposed to salt spray exposure. The aluminum substrate remained for 552 hours before corrosion was apparent.

What is claimed is:

1. A composition useful in providing corrosion protection for metal surfaces which composition comprises an acidic aqueous solution of a chitosan, which has been reacted with an additive selected from the group consisting of phosphorus-compounds which are phosphonic acids and sulfur-containing compounds comprising sulfur as a mercapto, thio, thienyl group, or as a mercapto functional silane, and mixtures of the foregoing to produce the modified chitosan, said acidic aqueous solution comprising a mineral acid, the modified chitosan, and water, and wherein the weight ratio of additive to chitosan in the modified chitosan is in the range of 10%/90% to 90%/10%.

2. A composition according to claim 1, wherein said phosphonic acid is selected from the group consisting of phyric acid, aminotri(methylenephosphonic)acid, hydroxyethane-di-phosphonic acid, diethylenetriamine-penta-methylene phosphonic acid, ethylenediamine-tetra-methylene phosphonic acid, hydroxyethylamino-di-methylene phosphonic acid, hexamethylenediamine-tetra-methylene phosphonic acid, 2-phosphonbutane-1,2,4-tricarboxylic acid, and mixtures of the foregoing.

3. A composition according to claim 1, wherein said sulfur-containing compound is selected from the group consisting of mercaptosuccinic acid, 3-(2-thienyl)acrylic acid, 3-(3-thienyl)acrylic acid, 4-(-2-thienyl)butyric acid, 3,3-thiodipropionic acid, and mixtures of the foregoing.

4. A composition according to claim 1, wherein said mercapto functional silane is selected from the group consisting of (3-mercaptopropyl) trimethoxy silane, (3-mercaptopropyl) methyldimethoxy silane, (3-mercaptopropyl)triethoxy silane, and mixtures of the foregoing.

5. A composition according to claim 1, wherein the metal surfaces comprise aluminum or aluminum alloys.

6. A composition according to claim 1, wherein the weight ratio of additive to chitosan is from 20% to 80%.

7. A composition according to claim 1, wherein the composition also comprises a material selected from the group consisting of solvents, surfactants, thickeners and combinations of the foregoing.

8. A composition according to claim 1, wherein the weight ratio of additive to chitosan is from 20% to 80%.

9. A composition according to claim 1, wherein the composition also comprises a material selected from the group consisting of solvents, surfactants, thickeners and combinations of the foregoing.

10. A composition according to claim 1, wherein said mineral acid comprises hydrochloric acid.

11. A composition according to claim 1 further comprising a solvent, wherein said solvent comprises 2-butoxyethanol.

* * * * *

UNITED STATES PATENT AND TRADEMARK OFFICE
CERTIFICATE OF CORRECTION

PATENT NO. : 6,706,214 B2 Page 1 of 1
DATED : March 6, 2004
INVENTOR(S) : Gerald Wojcik It is certified that error appears in the above-identified patent and that said Letters Patent is hereby corrected as shown below:

Column 8,
Line 16, delete the word "phyric" and replace it with -- phytic --

Signed and Sealed this

Thirtieth Day of November, 2004

JON W. DUDAS
*Director of the United States Patent and Trademark Office*